United States Patent [19]

Coppola et al.

[11] 3,813,990

[45] June 4, 1974

[54] SERVO SYSTEM INCLUDING FLOW VOTING REDUNDANT FAILURE CORRECTING HYDRAULIC ACTUATOR

[75] Inventors: Patrick S. Coppola, Schenectady; Luther D. Sunderland, Apalachin; Milton I. Wildrick, Endwell, all of N.Y.

[73] Assignee: General Electric Company, Wilmington, Mass.

[22] Filed: Apr. 12, 1972

[21] Appl. No.: 243,322

[52] U.S. Cl. .......................... 91/1, 91/20, 91/363 A, 91/6, 244/77 R
[51] Int. Cl. ........................ F01b 25/26, F15b 9/03
[58] Field of Search .. 91/363 R, 363 A, 365, 411 R, 91/196, 20; 244/77 R, 77 M

[56] References Cited
UNITED STATES PATENTS

| | | | |
|---|---|---|---|
| 3,279,323 | 10/1966 | Asche | 91/363 A |
| 3,426,650 | 2/1969 | Jenney | 91/363 A |
| 3,437,312 | 4/1969 | Jenney | 91/365 |
| 3,488,029 | 1/1970 | Durbin | 91/411 R |
| 3,505,929 | 4/1970 | Coppola et al. | 91/1 |
| 3,667,344 | 6/1972 | Westbury | 91/365 |
| 3,702,575 | 11/1972 | Campbell | 91/363 A |

Primary Examiner—Martin P. Schwadron
Assistant Examiner—A. M. Zupcic
Attorney, Agent, or Firm—I. David Blumenfield

[57] ABSTRACT

A servo system including redundant, failure correcting hydraulic actuator is described which operates on the "flow voting" principle and contains circuitry for detecting and indicating failure in any of the servovalve channels which control the actuator. In a preferred embodiment of the invention, a plurality of servovalves, preferably three or more, control a single actuator cylinder. The servovalves are operated in parallel with identical input signals. In normal operation each servovalve allows an equal amount of fluid to flow to the actuator cylinder. In the event of a failure of any servovalve (or any component of the associated servo loop), the remaining servovalves, automatically compensate the flow so that the actuator is still capable of controlling the load. Detection, indication and deactivation of a failed servovalve is provided by continuously comparing the relative position of each servovalve. Whenever the position of one servovalve varies from the other valves by an amount in excess of a preset threshold value (i.e., an amount in excess of that due to normal variations in valve tolerances) a malfunction is present. The failure detection circuitry provides an indication of the failure and the channel containing the failed servovalve is simultaneously deactivated. In one form, the circuitry for deactivating the servovalve channel so that the actuator output remains basically unaffected in the event of a second failure.

6 Claims, 4 Drawing Figures

SERVO SYSTEM INCLUDING FLOW VOTING REDUNDANT FAILURE CORRECTING HYDRAULIC ACTUATOR

This invention relates to a redundant, failure correcting hydraulic actuator and more particularly, to a hydraulic actuator in which failure of one of the control components for the actuator is detected, indicted and the failed component deactivated.

It will be understood that in the subsequent discussion reference to a servovalve failure is to be taken in a very broad context and includes not only a failure of the valve itself but any failure of any electrical, mechanical or electronic component in the servovalve loop which results in change in the valve position.

In control systems utilizing electrohydraulic actuators, some degree of redundancy is commonly required to provide for failure correction thereby improving the overall reliability of the system. Presently available electrohydraulic actuators having such redundancy are, as a rule, quite complex, and add cost and weight to the system.

A failure correcting, electrohydraulic actuator has been proposed which is simpler and less complex in nature than many of the available systems and operates on the so-called "flow-voting" principle. In a failure correcting actuator of this type a plurality, (typically at least three) servovalves, are connected to a common hydraulic cylinder and piston. The three servovalves are operated in parallel with identical input signals and are manifolded to the single actuator cylinder. The servovalves flows are therefore additive at the actuator cylinders and if one servovalve fails in any way, the hydraulic flow from the other two valves corrects the flow and maintains normal control. By making the loop gains of the servovalves high, the position error of the output piston can be made to be very small even if one of the servovalves has failed. Such a "flow voting" actuator has many advantages from the standpoint of simplicity, lack of complexity, and reduced cost since only a single main actuator is used so that the number of close fitting, moving parts are minimized thereby increasing the reliability and reducing the size and weight of the equipment. Such "flow voting" actuators, however, may have certain shortcomings which make the system, in the basic form described above, of limited applicability.

Thus, while a "flow voting" actuator system is perfectly capable of correcting for a first servovalve failure, failure of a second servovalve can, in some instances, cause violent or "hardover" response in the actuator output. A need therefore exists for a "flow voting" actuator in which a failure of one of the servovalves is detected, indicated, and the failed valve deactivated. In addition, it is desirable to minimize the effect of the failure of the first servovalve so that the failure of a second servovalve does not produce any violent change in the actuator output.

It has been found that these various desirable ends may be achieved by an arrangement based on continually sensing the relative positions of the servovalves. If the position of one servovalve differs from that of a companion servovalve by more than a predetermined amount, (an amount greater than the normal expected tolerances in the valves) this is a clear indication that one valve or a component in the valve servoloop has failed. An indication of that failure is produced and the failed servo channel is deactivated. By deactivating the failed servo channel any subsequent failure of another servo channel does not result in additive effects thereby avoiding the possibility of excessive, rapid, and severe perturbations in the actuator output. It has also been found that this approach may be further modified so that a second failure only has a passive effect on the system. This may be achived by not only removing the servo channel which fails first, but using this first failure to inhibit or prevent subsequent shutdown of the remaining channels so that a subsequent channel failure is passive in nature since the remaining servovalves remain in the hydraulic circuits and oppose each other. Upon a second valve failure, the actuator, therefore, remains in the position it was at the time of failure of the second serovovalve and no violent and excessive movement of the output actuator is produced. By virtue of this arrangement which incorporates failure detection and deactivation circuitry the failed servovalve loop can be removed from the system without affecting the output capability or position gain of the actuator. In addition, since failure detection is performed upstream of the output actuator ram, deviation of the output ram with failure of one of the elements is minimized and the performance of the actuator is stabilized to the greatest degree possible even with failure of one of the components.

It is therefore, a principal objective of the invention to provide a failure correcting electrohydraulic actuator in which failure of one of the servovalves in the actuator system is detected and corrected by removing the failed servovalve from the system.

A further objective of the invention is to provide a failure correcting electrohydraulic actuator system in which failure of one servovalve channel results in a deactivation of that channel and subsequent failures have only a passive effect on the actuator.

Still another objective of the invention is to provide a redundant "flow voting" electrohydraulic actuator which provides failure detection of any servovalve and removal of the failed servovalve.

Yet another objective of the invention is to provide a "flow voting" electrohydraulic actuator in which failure of one servovalve is detected and corrected by deactivating the failed servovalve. Servovalves which fail thereafter are not deactivated, and a second servovalve failure produces only a passive effect on the actuator.

still other objectives and advantages of the invention will become apparent as the description thereof proceeds.

The various objectives and advantages of the instant invention are achieved by providing an electrohydraulic actuator operating on a "flow voting" principle in which a plurality of servovalves operate in parallel with identical input signals. The servovalves are manifolded to a single actuator cylinder so that the flow through the servovalves is additive at the actuator cylinder. A failure of any one servovalve causes the remaining valves to overcome the incorrect flow and maintain the proper operation of the actuator. In order to detect and correct any such failure, the servovalves are continually monitored to determine the relative positions of the valves. If the position of any two valves differ more than a predetermined amount (an an amount chosen to exceed any difference in position which could be due to normal tolerance variations in the valves), a control signal is produced which actuates a logic circuit which indicates a failure of one of the servo channels, identifies which servo channel has failed, and automatically deactivates or disconnects the failed servo channel from the actuator. In addition, in order to prevent a subsequent failure from producing a violent reaction on the actuator, the failure of the first channel activates inhibiting circuitry which prevents deactivation of any subsequent failing channel, while at the same time, permitting an indication of the fact that a second channel has failed. By virtue of this arrangement, a simple, redundant, self correcting actuator circuit is provided, while at the same time, providing an indication of any failure and preventing a violent reaction of the actuator output in the event of more than one failure in the system.

Other features believed characteristic of this invention are set forth with particularity in the appending claims. The invention itself, however, together with other objects and advantages thereof, will be best understood by reference to the following description taken in conjunction with the accompanying drawings in which:

FIG. 1a is an illustration of one of the servovalves.

Figure 1:
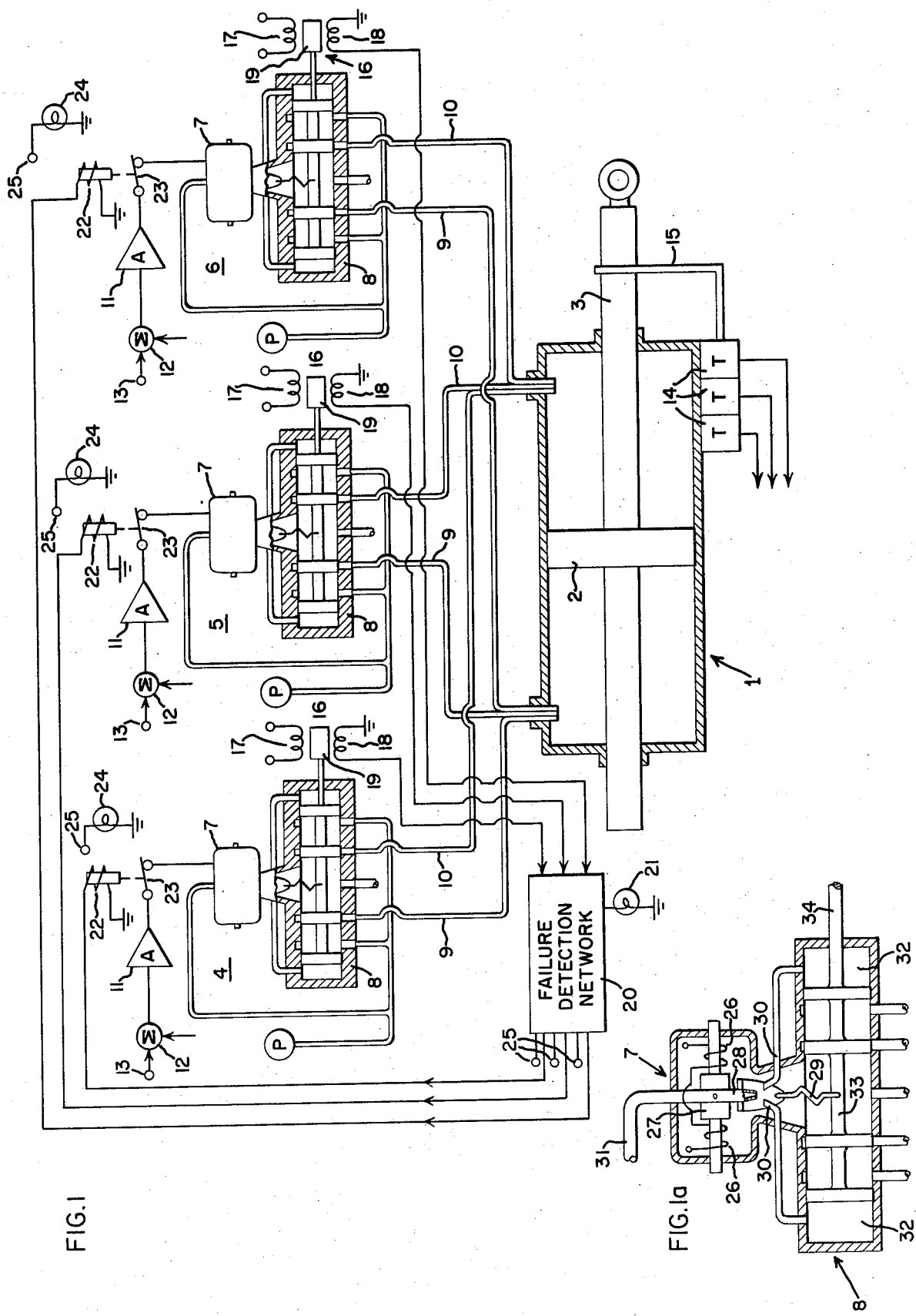
FIG. 1 is a schematic illustration of the flow voting actuator of the invention incorporating the failure detection and indicating circuitry.

FIG. 1 illustrates a "flow voting" electrohydraulic actuator which incorporates the various features of the invention by providing for the detection, indication, and correction of any failure in one of the servovalve channels. The flow voting actuator of FIG. 1 comprises a main hydraulic cylinder 1 containing a piston 2. A ram 3 is attached to the piston and positions the load which may, for example, be an aircraft thrust control system. A plurality of a two-stage jet pipe servovalve 4, 5 and 6 control the actuator cylinder and are manifolded to the cylinder so that the servovalve fluid flows are additive at the actuator cylinder. Each servovalve includes a torque motor 7 which controls a second-stage spool 8 to port fluid to the main actuator in response to a control signal. Thus, a fluid control line 9 from one control port of each servovalve is manifolded to the left-hand chamber of the main cylinder and a fluid control line 10 from the other control port of each servovalve is manifolded to the other chamber. In this fashion, each valve ports an equal amount of flow to the individual actuator cylinder chambers and the entire assembly is identical to a single loop system.

Each of the servovalves 4, 5 and 6 forms part of an independent servoloop or channel and is driven by a separate DC amplifier 11. The input to each amplifier is the output of a summing node 12 which receives an input or command signal from terminal 13 and a feedback signal from the position transducers 14 associated with the main actuator. The position transducers 14 are controlled by a mechanical link or arm 15 attached to the main ram and produce an output signal proportional to the position of the main actuator. The position feedback signal is thus compared with the command or input signal to provide an error signal which actuates the servovalve. The valve therefore acts to reduce the error to zero, producing a high accuracy precisely positioned servovalve output for each of the servovalve channels.

The three valves which are manifolded to the single actuator cylinder provide the element of redundancy to compensate for a malfunction in any one of the servovalves. If one servovalve malfunctions in any way, i.e., a malfunction in the valve itself, or in the electrical or electronic circuitry associated therewith or any component of the servoloop for the valve fails, "flow voting" comes into play so that hydraulic flow from the other two valves overcomes and compensates for the incorrect flow and the system still retains additional flow capacity for normal control. However, as was pointed out previously, a second valve failure can produce a severe reaction, since the two failed valves can override the remaining functioning servovalve. Consequently, it is necessary to provide a means for detecting and indicating the occurrence of the first failure and also for deactivating the failed channel so that a second failure will not have this undesirable effect. Furthermore, it is also desired to control the actuator equipment in such a manner that any second failure has no more than a passive effect on the actuator. To this end, failure detection, indicating and correction circuitry is provided which senses any failure of the servovalves, produces a visible indication of the fact that one of the servovalves has failed, identifies the particular servovalve which has failed and deactivates the servovalve channel containing the failed component.

The detection and correction of valve information is accomplished by continuously comparing the positions of the servovalve in pairs and determining whenever the difference in the relative position of any given pair exceeds a predetermined threshold value. Since all of the valves are driven from the same source of command signals, the position of all the valves should be substantially the same, differing only by minor amounts attributable to differences in the tolerances between the various servovalves. Thus, if the position of any valve differs from the position of the other two by more than a predetermined amount, then there is a substantial degree of certainty that the difference represents a failure or serious malfunction and suitable indication and correction thereof is provided. Each of the servovalves 4, 5 and 6 includes a position sensing transducer 16 associated with the second stage spool which produces an output signal proportional to the valve spool position. The transducer, which is shown in schematic form, is a linear variable differential transformer having an input winding 17 energized from source of 400 Hz signals, a secondary or output winding 18 and a movable core or armature 19 attached to the servovalve spool. The position of the servovalve spool controls the position of armature 19 to produce an amplitude modulated 400 Hz signal at output winding 18, the phase of which indicates the direction of the spool movement and the index of modulation of which is proportional to the amount of movement.

The outputs from the linear variable differential transformers are applied to a failure detecting network 20 in which the spool positions of the servo-valves are compared. An error signal is produced whenever the spool position of any pair of valves differs by more than the predetermined threshold amount. The error signal actuates a logic network which, (1) deactivates the channel with the failed servovalve, (2) produces an indication of a failure and (3) also identifies the failed channel. To this end, a warning lamp 21, associated with network 20, is energized to produce an indication of a failure whenever any one of the servovalve channels has failed. In addition, network 20 controls relays 22 associated with each of the channels. Each relay includes a winding which controls a normally closed contact 23 connected between the output of servo amplifiers 11 and the servovalve. When relay 22 is energized contact 23 is opened and the input voltage to the servovalve is removed to deactivate the servo channel. A failure indicating lamp 24 is connected to an output terminal 25 in network 20 and is energized to identify the failed channel whenever a channel is deactivated. Thus, in the absence of a failure, all of the relays 22 are deenergized, relay contacts 23 are in the normally closed position and the outputs of the servo amplifiers 11 are connected to servovalves 4, 5 and 6. Whenever a failure or malfunction is detected by network 20, one of the relays is energized disconnecting the control signal from the servovalve removing that valve channel from the actuator. Simultaneously, warning lamp 21 and the channel failure indicating lamp 24 associated with the failed channel are energized to produce a failure indication and identification.

The two-stage, jet pipe servovalves 4, 5 and 6 are identical in construction and operation and one of these valves 1, shown in highly schematic form in FIG. 1a. Such valves are well-known devices available commercially from many sources. One Company which sells such two-stage jet pipe servovalves is The Abex Corporation, Oxnard, Calif. The two-stage, jet pipe servovalve consists of the electrical torque motor 7 and a hydraulic output stage which, as may be seen, comprises a second-stage spool 8 which controls the porting of a hydraulic fluid from a source to the actuator chambers. The toruqe motor includes motor windings 26, shown schematically, which act upon an armature 27 to which a jet pipe 28 is attached. The current flowing in the motor windings produces a torque on the armature which pivots the armature and the attached jet pipe through a few minutes of arc against the restraint of a position feedback spring 29 attached to the second stage spool. This motion moves the jet pipe nozzle between two receiver pipes 30 which control the position of the second-stage spool. With no electrical input signals, the fluid issuing from the jet pipe, which is connected to a suitable supply line 31, is centered and divides equally between the receiver pipes. The receiver pipes are connected to end chambers 32 of the servovalve spool and the differential pressure between these two end chambers positions the second-stage spool 33 to control the flow of the fluid to the main actuator chamber. If an electrical signal is applied to the torque motor which deflects the jet pipe to the right, for exzmple, the right hand receiver pipe receives a greater amount of fluid as does the right end chamber 32 thereby driving the second-stage spool to the left. This ports more high pressure fluid from the pressure source to the right hand end of the main hydraulic cylinder and drives the piston and the ram to the left. In this fashion, the second-stage spool is positioned in response to the input error current varying the size of the output ports and controlling the amount of fluid flowing to the actuator. Since the armatures 19 of the linear variable differential transformers 16 are connected to spools 33 by means of the shafts 34, an amplitude modulated signal proportional to the valve spool positions is produced in output windings 18. This signal is utilized in the failure detection circuitry to deactivate one of the channels if there has been a failure of one of the servovalves.

Figure 2:
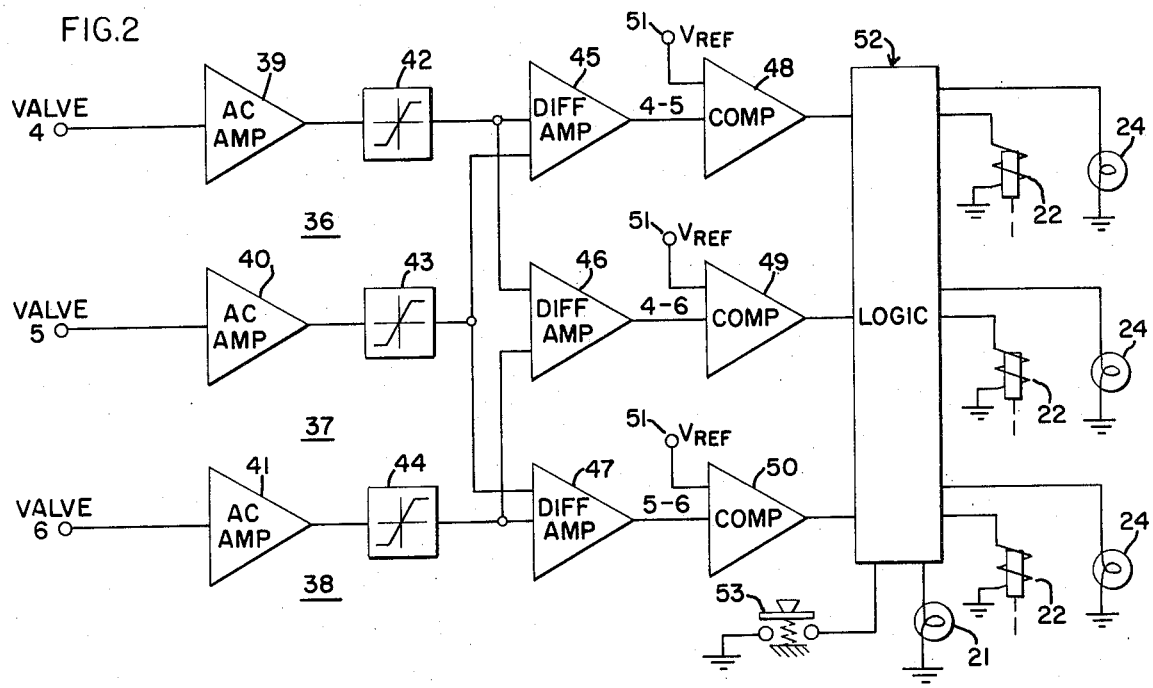
FIG. 2 illustrates a portion of the failure detection circuitry of FIG. 1, specifically, the servo channel comparator circuitry.

FIG. 2 illustrates in block diagram form, one portion of the failure detection network 20 of FIG. 1. FIG. 2 shows the comparator circuitry in which the servovalve spool positions are compared to determine whether the difference in valve positions is sufficeint to indicate a failure of one of the valves. If there is sufficient difference in valve position to indicate a valve failure, an output signal from the comparator is applied to a logic network which determines which valve has failed and produces control signals both for disabling the channel containing the failed servovalve and for indicating a failure and identifying the failed channel. Thus, the comparator circuit shown generally at 35 includes three valve position comparator channels 36, 37 and 38 with each channel comparing the position of one pair of valves. The channels are interconnected so that each channel compares the relative position of one valve pair with channel 36 comparing valves 4, and 5, channel 37 comparing valves 4 and 6, and channel 38 comparing valves 5 and 6. It will immediately be obvious that failure of one valve produces an output signal from those two comparator channels to which the failed valve is common. Thus, failure of valve 4 produces an output from channels 36 and 37; failure of of valve 5 produces an output from channels 36 and 38; and failure of valve 6 produces an output from channels 37 and 38. This duality is necessary in order to resolve the inherent ambiguity associated in an arrangement in which relative valve positions are compared. That is, if the position of two valves differs by an amount indicating a failure in that servovalve channel, there is no way of telling which of the two channels has failed. However, since each valve position is compared with that of two other valves, this ambiguity will be resolved in the logic circuitry since an output will be produced only from those two channels common to the failed valve. These two signals are processed in the logic circuitry by suitably "ANDING" the comparator channels in pairs so that each AND circuit responds to the comparator output signals having a common valve. Thus, as will be pointed out in detail below in connection with FIG. 3, one AND gate is responsive to the output signals from the channel comparing valves 4 and 5 and valves 4 and 6 so that it is actuated only if valve 4 fails; one AND gate is responsive to output signals from the channels comparing valves 4 and 5 and valves 5 and 6 so that it is actuated only if valve 5 fails; and the remaining AND gate is responsive to output signals from the channels comparing valves 4 and 6 and valves 5 and 6 so it is actuated only if valve 6 fails.

The inputs to channels 36, 37 and 38 are respectively the inputs from the linear variable differential transducer associated with servovalve 4, 5 and 6. The input signal from each of these transformers is, as pointed out previously, a 400 Hz amplitude modulated signal, the phase of which is determined by the direction of movement of the valve spool from the central or neutral position with the index of modulation proportional to the amount of movement. The modulated signals are amplified in amplifiers 39, 40 and 41 and applied to demodulators 42, 43 and 44. The output of each demodulator is a D.C. signal the sign of which is proportional to the phase of the input signal (and therefore, the direction of departure of the servovalve spool) and the magnitude of which is proportional to the modulation of the input signal, i.e., the amount of spool movement. The unidirectional signal from each of demodulators 42–44 is applied as an input to two of the three differential amplifiers 45, 46 and 47. The spool position of one pair of servovalves is thus compared in each differential amplifier to produce a signal which is proportional to any differences in the servovalve spool positions. Thus, differential amplifier 45 in channel 36 compares the outputs of demodulators 42 and 43 and hence, the difference in spool positions of servovalves 4 and 5. Similarly, the demodulator outputs are so connected to differential amplifiers 46 and 47 that differential amplifier 46 in channel 37 compares the difference in spool positions of servovalves 4 and 6 whereas differential amplifier 47 in channel 38 compares the difference in position between servovalve spools 5 and 6. Thus, each channel compares the difference in spool positions of one distinct pair of servovalves.

The output signals from differential amplifiers 45–47 are applied respectively, as one input to dual comparator amplifiers 48–50 in which the difference in spool positions of each pair of servovalves is compared with the reference voltage applied at input terminals 51. The reference voltage applied at terminal 51 is a threshold voltage which represents some fraction of the maximum valve spool travel and constitutes difference in valve spool position which is an indication of a failure of the servovalve. Thus, the voltage reference is made equal to a percentage, 25 to 30 percent, for example, of the maximum spool travel. In other words, if there is a difference in valve spool positions of 25 percent or more of the maximum spool travel, it can be safely assumed that there is a failure of one of the valves and the dual comparator amplifier produces an output signal which represents a failure. The output signals from the dual comparators are applied to the logic network 52, presently to be described, which controls the servovalve relays 22 and the channel failure indicating lamps 24 whenever an output is produced from the dual comparators which indicates that one of the servovalves has failed. A reset switch 53 is associated with logic network 52 to reset the failed channel and place it back in operation to determine whether a failure was intermittent in nature, or that the failure has in some way been corrected.

The operation of the comparator network of FIG. 2 may best be understood in connection with the following example. With zero command signal to input terminal 13 of servovalve 4, second-stage spool 8 of that servovalve remains centered and the output of the position transducer (i.e., linear variable differential transformer 16 associated with that valve) is zero volts. Assume a positive command signal (one which will drive the actuator ram to the left) an input terminals 13. Torque motor 7 operates to position the jet pipe in such a manner as to move the second stage spool to the right displacing the armature of the linear variable differential transformer in the same direction. A 400 Hz amplitude modulated, in-phase signal appears across output winding 18. The phase of the amplitude modulated signal indicates the direction of movement and the percent modulation the amount of movement. The signals from the differential transformers are applied respectively to comparator channels 36, 37 and 38. The signals are amplified, and emodulated to produce a DC voltage having a polarity determined by the phase of the input signal, and an amplitude proportional to the amount of movement of the second-stage spool. This varying unidirectional voltage is applied to the differential amplifiers 45–47. The position of the second-stage spool of servovalve 4 is compared to the position of servovalve 5 in amplifier 45 of channel 36, the positions of valves 4 and 6 are compared in amplifier 46 of channel 37 and the positions of valves 5 and 6 are compared in amplifier 47 in channel 38. The output from differential amplifiers 45–47 is a DC voltage which is equal to the difference of the input voltages and is, therefore, proportional to the difference in valve spool positions. The output voltage from amplifiers 45–47 is applied to comparators 48–50 each of which compares these voltages representing the spool positions of the valve pairs with a reference or threshold voltage which indicates failure. If the absolute value of the output from any differential amplifier is equal to or greater than the reference voltage, then an output signal is produced from the dual comparators and applied to the logic circuit to produce a failure registration in the logic circuit.

Assuming that servovalve 4 is the one that has failed so that the difference between its spool position and that of the remaining servovalves exceeds the 25 percent maximum spool travel which has been established as the threshold value, then the output of differential amplifier 45 in channel 36 produces a signal at its output which is equal to or greater than the reference voltage at the input terminal 51 of dual comparator 48 so that comparator 48 produces an indication that either valve 4 or valve 5 has failed. It will be apparent that since the output of demodulator 42 is also applied to differential amplifier 46 in channel 37 dual comparator 49 produces an output indicating that either valve 4 or valve 6 has failed. However, logic circuit 52 is so organized that this ambiguity is resolved and only the servo channel actually having the failed servovalve is identified and inactivated.

Figure 3:
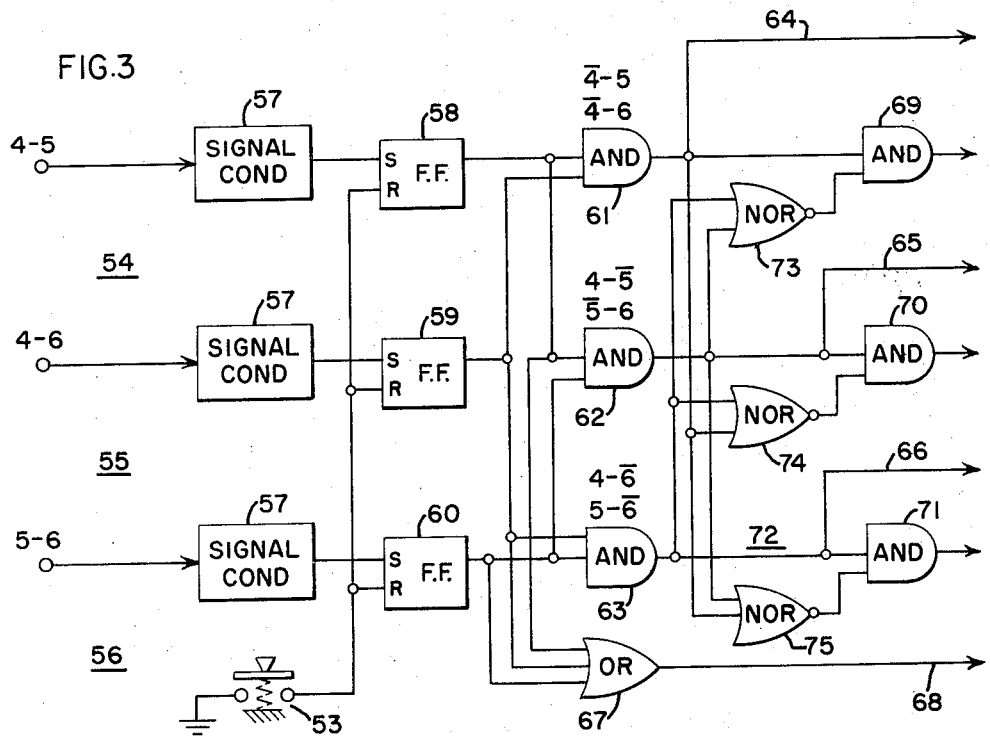
FIG. 3 shows the servo channel control and deactivating logic forming part of the failure detection circuitry of FIG. 1.

FIG. 3 shows the details, in block diagram from. of the logic circuitry illustrated at 52 in FIG. 2. The outputs from dual comparators 45–47 of channels 36–38 respectively, are applied as inputs to logic channels 54–56. The comparator signals are processed to resolve the ambiguity inherent in comparing the relative positions of the servovalves, and control signals are produced to deactivate and identify the failed servovalve channel. Each of the channels contains a signal conditioning circuit 57 to provide a logic level signal compatible with the requirements of the flip-flop memories 58–60 which have their set input terminals connected to the output of the signal conditioning circuits. The flip-flop outputs switch to a logic ONE level whenever the comparator output, as processed by signal conditioning circuit 57, is at a level indicating that the input to the corresponding dual comparators 45–47 has exceeded the reference voltage so that a failure of one of the servovalves is indicated. Flip-flops 58–60 not only provide output signals of the proper logic levels to actuate the remainder of the logic circuitry, but they also provide memory to store an indication of a valve failure to keep the failed servo channel deactivated. Once set in response to a failure, the flip-flops remain in the set state until reset by means of the reset button 53 connected to their reset terminals. The reset button is provided so that the channel may be reactivated in the event the failure was a temporary or intermittent one. Actuation of the reset button applies ground potential to the reset terminal and resets the flip-flop so that its output returns to the logic ZERO level thereby reactivating the servo channel. If the servovalve is still malfunctioning, the cycle is repeated and the flip-flop in the particular channel is again set and its output goes to a logic ONE level.

The output signals from flip-flops 58–60 are applied to the input terminals of Comparator and Indicating AND gates 61–63. The flip-flops and AND gates are so interconnected that each AND gate responds only to a failure of one of the servovalves. To this end, the inputs to each of the AND gates are signals comparing the state of two different servovalve pairs with each servovalve pair including a common servovalve. Consequently, the AND gate is actuated only if the common servovalve has failed. Each of the AND gates has a different servovalve as the valve common to the pairs so that each AND gate produces an output control signal in response to a failure by one and only one specific valve. The output from each flip-flop is therefore, applied as an input to an AND gate in two of the channels so that the proper relationship is eatablished in the logic network. Thus, the output of the channel 54 flip-flop is applied to AND gate 61 in channel 54 and to AND gate 62 in channel 55. Flip-flop 59 in channel 55 is applied to AND gate 61 in channel 54 and AND gate 63 in channel 56, whereas the output from flip-flop 60 in channel 56 is applied to AND gates 62 and 63 in channels 55 and 56. Thus, AND gate 61 is actuated only if flip-flops 58 and 59 are set in response, respectively, to a failure in servovalve 4 or 5 or a failure of servovalves 4 or 6. The inputs to AND gate 61 in channel 54 will be at the logic ONE level only if the servovalve common to those channels, namely servovalve 4, has failed. Only if valve 4 has failed, are the inputs to flip-flops 58 and 59 and in channel 54 and channel 55 of the level to cause those flip-flops to switch to the logic ONE level. If, on the other hand, valve 5 has failed, the input to flip-flop 58 in channel 54 which compares the state of valves 4 and 5 causes its output to go to the logic ONE level. However, the input to flip-flop in channel 55 does not cause that flip-flop to change its state since this flip-flop is responsive only to the spool positions of valves 4 and 6, neither of which has malfunctioned. It can be seen therefore, that each AND gate is actuated in response to a failure of a different servovalve.

The outputs from AND gates 61–63 are applied over leads 64–66 to channel failure indicating lamps 24 associated with each of the disabling relays. Thus, whenever any of the AND gates 61–63 is actuated to indicate a failure of one of the servovalves, the channel failure indicating lamp associated with that particular valve is energized to produce an indication and identification of the failed channel. A second failure of a servovalve is also indicated by energizing another indicating lamp even though, as will be pointed out in detail later, deactivation of a second servovalve channel is inhibited. In addition to energizing the channel failure lamps, the warning lamp 21 associated with the failure detection circuitry is also energized by means of the OR gate 67. OR gate 67 has three inputs connected respectively to the outputs flip-flops 58–60 and an output 68 connected to warning lamp 21. Thus, whenever any one of the flip-flops is set to the logic ONE state, indicating a servovalve has failed, there is an input to OR gate 67. This energizes the warning lamp over lead 68 to produce an indication that one of the servovalve channels has a malfunction. As pointed out previously, the individual AND gates 61–63 also energize one of the channel failure indicating lamps 24 to identify the specific channel which contains the failed or malfunctioning servovalve.

The outputs of the AND gates 61–63 are also applied as one input to servovalve Deactivating AND gates 69–71. The other input to And gates 69–71 is from inhibit network 72 which inhibits shutdown of the remaining servo channels after one servovalve channel has been deactivated. Inhibit network 72 includes three NOR gates 73–75. The NOR gates are characterized by the fact that their output is at a logic ONE level whenever both inputs are at a logic ZERO level. When any input to the NOR gate is at the logic ONE level, the output of the NOR gate goes to the logic ZERO level thereby disabling its associated AND gate. NOR gates 73–75 are controlled by the outputs of AND gates 61–63. Specifically, the inputs for the NOR gate in any one channel is from the AND gates in the remaining two channels so that a logic ONE output from any of AND gates 61–63 in one channel, immediately applies a logic ONE to the NOR gates in the remaining two channels. The outputs of these NOR gates go to the logic ZERO level, disabling their associated Deactivating AND gates and thereby inhibiting deactivation of a second servovalve channel. NOR gate 73 in channel 54 has inputs from AND gates 62 and 63 in channels 55 and 56 whereas NOR gates 74 in channel 55 is controlled from AND gates 61 and 63 in channels 54 and 56. Similarly, NOR gate 75 in channel 56 is controlled from AND gates 61 and 62 in channels 54 and 55. As long as all three channels are operating properly, i.e., none of the servovalves have failed, the output of AND gates 61–63 are all at the ZERO logic levels so that the inputs to all of the NOR gates are at the logic ZERO level. The output from all three NOR gates are therefore at the logic ONE level thereby enabling all of the Control and Deactivating AND gates 69–71. Whenever one of the servovalves fails so that an AND gate in that channel goes to logic ONE level to deactivate one of the channels, one input to the NOR gates associated with the remaining two channels also go to the logic ONE level. The outputs of these NOR gates switch to the logic ZERO level thereby disabling the remaining two Deactivating AND gates and preventing a shutdown of the remaining servovalve channels even if a second malfunction occurs. Assume, for example, that valve 4 has failed and the output from AND gate 61 goes to the logic ONE level. Since the output of AND gate 61 in channel 54 is coupled to NOR gates 74 and 75 in channels 55 and 56, the output of NOR gate 74 and 75 goes to the logic ZERO level thereby disabling control and Deactivating AND gates 70 and 71 in channels 55 and 56. Since NOR gate 73 associated with channel 54 is controlled by the outputs of AND gates 62 and 63 of channels 55 and 56, its inputs both remain at the ZERO logic level. The output from NOR gate 73 therefore remains at the logic ONE level enabling AND gate 69 in channel 54 so that disabling relay 22 associated with servovalve 4 channel remains energized to deactivate the channel.

It can be seen that inhibit network 72 prevents a deactivation of any servo channel after the occurrence of the first malfunction and the deactivation of that channel. Thus, any subsequent failure of a servovalve in a second channel will produce an indication by energization of the associated channel failure lamp, however the inhibit circuit prevents the servovalve in that second channel from being inactivated. As a result, a subsequent failure is passive in nautre since the two remaining servovalves remain in the hydraulic circuit and oppose each other. In the event of a second failure, therefore, the actuator remains in the position it was at the time of the second failure and no violent and excessive movement of the actuator will result.

OPERATION

The operation of the redundant self-correcting hydraulic actuator with failure detection, indication, and correction may be best understood by considering the following discussion of several operating modes for the system. Assume that all servovalves are operating properly, i.e., the difference in spool position between any of the two valve pairs is less than the predetermined amount which indicates failure. Also assume that a difference of 25 percent of the maximum spool travel is considered the threshold level so if the position of any two valve spools differs by 25 percent or more of the maximum spool travel, it can be assumed that one of the valves has failed. In the absence of any such failure, the output from the linear differential transformer associated with each of the second-state servovalve spools are essentially the same, differing only by amounts due to differences in valve tolerances. The outputs from demodulators 42—44 and differential amplifiers 45—47 in channels 36–38 are therefore less than the reference potential applied at terminals 51 of the dual comparator amplifiers 48–50. As a result, none of the dual comparator amplifiers produce an output signal of a sufficient level to set any of the flipflops 58–60 to the logic ONE level. The outputs from all of these flip-flops are therefore at the logic ZERO level and none of the AND gates 61–63 and 69–71 produce an output to energize the servovalve disabling relays 22.

Assume now that servovalve 4 begins to malfunction in some manner, either by failure of the electronics, the torque motor or of the second stage spool so that the position of spool 8 of valve 4 now differs from the spool positions of valves 5 and 6 by more than 25 percent of the maximum spool travel. The output of the differential transformer 16 associated with the spool of servovalve 4 now reflects this difference in spool position and the input to channel 36 of the comparator network is such that the output of demodulator 42 of channel 34 differs from the output of the demodulators 43 and 44 by an amount representative of this difference in spool position. Differential amplifier 45 of channels 36 now produces an output which is the difference between the spool positions of valves 4 and 5 and exceeds 25 percent of the maximum spool travel indicating that either valve 4 or valve 5 has failed. Simultaneously, differential amplifier 46 in channel 37 produces an output voltage proportional to the position of valves 4 and 6 which exceeds 25 percent of the maximum spool travel indicating there has been a failure in either valve 4 or valve 6. Hence, the inputs from differential amplifiers 45 and 46 to dual comparator amplifiers 48 and 49 both exceed the reference voltage at input terminals 51 and dual comparator amplifiers 48 and 49 produce signal of a magnitude indicating a failure. Comparator amplifier 50 in channel 38, on the other hand, which is responsive to the positions of servovalves 5 and 6, produces no output since the positions of these servovalve spools differ by an amount less than 25 percent of maximum travel. Thus, the failure of one valve produces an output from the dual comparators in the two channels, i.e., those channels which have the failed valve in common.

The outputs from the dual comparators in channels 36 and 37 are processed in interface networks 57 and applied to the set terminals of flip-flops 58 and 59 of channels 54 and 55. These signals set flip-flops 58 and 59 so that their outputs go to the logic ONE level. Comparator 50 in channel 38, on the other hand, has no effect on flip-flop 60 and its output remains at the logic ZERO level.

When flip-flops 58 and 59 are set to the logic ONE level, both of the inputs to AND gate 61 go to the logic ONE level thereby producing a logic ONE at its output. AND gates 62 and 63 in channels 55 and 56, on the other hand, not actuated since one input to each of these two AND gates is controlled by flip-flop 60 in channel 56 which has remained at the logic ZERO level. The AND gate channels 55 and 56 reamin unaffected while AND gate 61 in channel 54 goes to a logic ONE level. The logic ONE output from AND gate 61 energizes the channel failure lamp 24 associated with servovalve 4 and is also applied as one input to the Control and Deactivating AND gate 69 in channel 54.

The output from AND gate 61 is also applied to NOR gates 74 and 75 causing the output of these NOR gates to go to the logic ZERO state thereby disabling AND gates 70 and 71 in channels 55 and 56. The inputs to NOR gate 73 in channel 54, however, remains at the logic ZERO level since these inputs are connected through AND gates 62 and 63 in channels 55 and 56 which, as pointed out before, have not been actuated. Consequently, both inputs to Deactivating AND gate 69 in channel 54 are at the logic ONE level. The output of AND gate 69 goes to the logic ONE level energizing disabling relay 22 associated with servovalve 4. When the relay associated with servovalve 4 is energized, the normally closed contact 23 connected between amplifier 11 and torque motor 7 is opened removing the energizing voltage for the torque motor thereby deactivating the servovalve channel containing servovalve 4. The remaining two valves now supply the additional fluid flow required to maintain the actuator in the position called for by the input signals at the terminals 13 of the valves 5 and 6.

Reset button 53 is provided to give the operator or pilot etc., the opportunity to reset the failed channel in the event the failed servovalve has been repaired or in the event that the failure was one of short duration. Upon closing of reset button 53, ground potential is applied to the reset terminals of flip-flops 58–60 resetting any flip-flop which has been previously set so that the output of flip-flop 58 goes back to the logic ZERO state. When the output of flip-flop 58 which was previously at logic ONE level returns to the logic ZERO level, the output of AND gate 61 in channel 54 returns to the logic ZERO level since one of the inputs to this AND gate is now at the logic ZERO level. Lead 64 to channel failure indicating lamp 24 is now deenergized extinguishing the lamp and terminating the indication of a failure of servovalve 4. Similarly, only one input to AND gate 69 is now at the logic ONE level and the output goes to the logic ZERO level deenergizing disabling relay 22. Armature 23 of the relay returns to the normally closed position applying the output from amplifier 11 to the torque motor of servovalve 4 and servovalve 4 is thereby reactivated. If servovalve 4 is still malfunctioning, the difference between the spool position of valve 4 and the remaining valves again exceeds the threshold level. Flip-flop 58 in channel 54 is again set by the output from the dual comparators 48 and 49 in channels 36 and 37. AND gates 61 and 69 are actuated to energize relay 22 disabling the valve and removing the channel from operation. Simultaneously, the channel failure indicating lamp 24 is once again energized to produce further an indication that this channel has failed and been deactivated. This manual reset procedure may be repeated by the operator or pilot as desired at various times to determine whether the channel and the servovalve are still malfunctioning and the system will automatically deactivate the channel if it turns out that there has been no correction of the malfunction.

It will be apparent that the arrangement described may be modified by eliminating the inhibiting circuitry which prevents any channel deactivation after the first failure where there is no real need for an ensuring passive second failure. Where this additional requirement is not important the NOR circuits as well as the deactivating AND gates 69–71 may be dispensed with and the relays and lamps controlled from the first set of AND gates 61–63.

A second failure than automatically shuts down the remaining two channels and the actuator remains in the position it was in at the time of second failure. However, the actuator is now without power and only frictional forces maintain the actuator in position.

It can be seen therefore, that a redundant, failure correcting hydraulic actuator is provided which contains circuitry for detecting and indicating failure of any of the servovalves controlling the actuator. Furthermore, it can be seen that the system is simple in nature, highly effective in operation, and will prevent violent perturbations or changes in the actuator output in the event of a second failure by inhibiting the deactivating network after the first failure has occurred. Thus, a system which has great reliability is provided while minimizing or reducing the complexity, cost and weight of the system.

While a particular embodiment of this invention has been shown, it will, of course, be understood that the invention is not limited thereto since many modifications, both in the structural arrangement and in the instrumentalities employed, may be made. It is contemplated by the appended claims to cover any such modifications as within the true spirit and scope of this invention.

What is claimed as new and desried to be secured by Letters Patent of the U.S. is:

1. A redundant, failure correcting servo system for a hydraulic actuator comprising:
   a. a hydraulic positioning means including a hydraulically actuated movable output member,
   b. at least three electrically controlled servovalves for supplying hydraulic fluid to said positioning means to position said movable output member in response to the combined flow of fluid from all of said servovalves in response to an input signal applied to all of said servovalves,
   c. feedback means from said positioning means to each said servovalves for feeding back a signal representative of the position of said movable output member to establish independent servovalve channel loops for each of said valves,
   d. means for continuously comparing the position of the servo valves by comparing the position of each valve with that of each of the other valves,
   e. means for producing a control signal whenever the position of any valve differs from the position of any other valve by more than a predetermined amount,
   f. and deactivating means responsive to said control signal for removing the servovalve channel containing the servovalve which differs in position by more than the predetermined amount from operation whereby the remaining valves control the flow of hydraulic fluid to said hydraulic positioning means.

2. The hydraulic servo system according to claim 1 including means responsive to said control signal to produce a failure indication.

3. The hydraulic servo system according to claim 1 wherein each of said servovalves has a valve position sensing means associated therewith for producing an electrical signal which is indicative of the position of the servovalve associated therewith and means for coupling the electrical signals from said sensing means to said comparing means.

4. The hydraulic servo system according to claim 1 wherein said deactivating means contains inhibiting means coupling the control signals for deactivating one servovalve channel to said inhibiting means, to actuate said inhibiting means thereby preventing deactivation of any of the remaining servovalve channels after deactivation of any of the servovalve channels.

5. The hydraulic servosystem according to claim 3 wherein said comparing means includes a plurality of comparators each of which is responsive to the outputs of two of said valve position sensing means to produce an output if the difference in valve positions exceeds a predetermined amount, a plurality of AND gate means coupling the outputs of two of the plurality of comparators to the input of each AND gate means, the inputs of each AND gate means representing the relative position of two different valve pairs having one common valve whereby each AND gate means produces an output control signal in response to a failure in one of the servovalve channels.

6. The hydraulic servosystem according to claim 5 wherein said AND gate means includes inhibiting means responsive to the control signal from one of said AND gate means to prevent the production of control signals from the remaining AND gate means.

* * * * *